(12) United States Patent
Katayama

(10) Patent No.: US 11,816,552 B2
(45) Date of Patent: Nov. 14, 2023

(54) DYNAMICALLY RECONFIGURABLE NETWORKED VIRTUAL NEURONS FOR NEURAL NETWORK PROCESSING

(71) Applicant: INTERNATIONAL BUSINESS MACHINES CORPORATION, Armonk, NY (US)

(72) Inventor: Yasunao Katayama, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1278 days.

(21) Appl. No.: 15/794,482

(22) Filed: Oct. 26, 2017

(65) Prior Publication Data

US 2019/0130246 A1 May 2, 2019

(51) Int. Cl.
*G06N 3/04* (2023.01)
*G06N 3/10* (2006.01)
*G06N 3/063* (2023.01)

(52) U.S. Cl.
CPC .............. *G06N 3/04* (2013.01); *G06N 3/063* (2013.01); *G06N 3/10* (2013.01)

(58) Field of Classification Search
CPC .............. G06N 3/04; G06N 3/063; G06N 3/10
See application file for complete search history.

(56) References Cited

U.S. PATENT DOCUMENTS

| | | | |
|---|---|---|---|
| 2008/0120260 A1* | 5/2008 | Yancey | G06N 3/063 706/33 |
| 2016/0210550 A1 | 7/2016 | Merrill et al. | |
| 2016/0217388 A1* | 7/2016 | Okanohara | G06N 20/00 |
| 2017/0006141 A1 | 1/2017 | Bhadra | |
| 2017/0076195 A1 | 3/2017 | Yang et al. | |
| 2017/0256254 A1* | 9/2017 | Huang | G06N 3/0445 |
| 2018/0336458 A1* | 11/2018 | Tomioka | G06N 3/08 |

FOREIGN PATENT DOCUMENTS

| | | |
|---|---|---|
| WO | 2016118815 | 7/2016 |
| WO | 2017034527 | 3/2017 |

OTHER PUBLICATIONS

Ba et al., Adaptive Dropout for Training Deep Neural Networks, Proceedings of the 26th International Conference on Neural Information Processing Systems, vol. 2, Dec. 2013. (Year: 2013).*

(Continued)

*Primary Examiner* — Marshall L Werner
(74) *Attorney, Agent, or Firm* — Tutunjian & Bitetto, P.C.; Randy Emilio Tejeda

(57) ABSTRACT

Methods and systems for neural network processing include configuring a physical network topology for a network that includes hardware nodes in accordance with a neural network topology, one of which is designated as a master node with any other nodes in the network being designated as slave nodes. One or more virtual neurons are configured at each of the hardware nodes by the master node to create a neural network having the neural network topology. Each virtual neuron has a neuron function and logical network connection information that establishes weighted connections between different virtual neurons. A neural network processing function is executed using the neural network.

18 Claims, 10 Drawing Sheets

(56) References Cited

OTHER PUBLICATIONS

Shayeji et al., Analysis and Enhancements of Leader Elections Algorithms in Mobile Ad Hoc Networks, Oct. 2012. (Year: 2012).*
Islam et al., A New Adaptive Merging and Growing Algorithm for Designing Artificial Neural Networks, IEEE transactions on systems, man, and cybernetics. Part B, Cybernetics: a publication of the IEEE Systems, Man, and Cybernetics Society 39(3), pp. 705-722, Jun. 2009. (Year: 2009).*
Parker et al., (Distributed Neural Network: Dynamic Learning via Backpropagation with Hardware Neurons using Arduino Chips, pp. 206-212, 2016. (Year: 2016).*
Weerasinghe et al., Disaggregated FPGAs: Network Performance Comparison against Bare-Metal Servers, Virtual Machines and Linux Containers, 2016 IEEE 8th International Conference on Cloud Computing Technology and Science, Dec. 2016. (Year: 2016).*
Li Li et al., Research On Mobile Multimedia Broadcasting Service Integration Based On Cloud Computing, 2010 International Conference on Multimedia Technology, Ningbo, Oct. 2010, pp. 1-4.
Shree Krishna Sharma et al., Live Data Analytics With Collaborative Edge and Cloud Processing in Wireless IoT Networks, IEEE Access, Mar. 2017, pp. 4621-4635, vol. 5.

\* cited by examiner

DYNAMICALLY RECONFIGURABLE NETWORKED VIRTUAL NEURONS FOR NEURAL NETWORK PROCESSING

BACKGROUND

Technical Field

The present invention generally relates to neural network processing and, more particularly, to reconfigurable virtual neuron networks for neural network processing.

Description of the Related Art

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by conventional program-based computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Since the processing of neural networks, in particular learning, asks for significant computational power, these neural network tasks, and cognitive tasks in general, are often handled in computational clouds. However, the implementation of neural networks is expected to change as capabilities of end point edge devices (smart phones, internet of things, etc.) evolve as computational tasks for neural networks are collectively handled in more distributed manners. For example, edge systems and cloud systems can be connected in a tiered manner, with cognitive tasks being handled at both edge and cloud layers. There exists no systematic approach to dynamically process and reconfigure neural network tasks in highly virtualized and changing environments across multiple edges and cloud.

SUMMARY

A method for neural network include configuring a physical network topology for a network that includes hardware nodes in accordance with a neural network topology, one of which is designated as a master node with any other nodes in the network being designated as slave nodes. One or more virtual neurons are configured at each of the hardware nodes by the master node to create a neural network having the neural network topology. Each virtual neuron has a neuron function and logical network connection information that establishes weighted connections between different virtual neurons. A neural network processing function is executed using the neural network.

A system for neural network processing includes a master hardware node in communication with one or more slave hardware nodes. The master hardware node has a processor configured to configure a physical network topology for a network that includes the master hardware node and the slave hardware nodes in accordance with a neural network topology. One or more virtual neurons at the master hardware node and at each slave hardware nodes are also configured to create a neural network having the neural network topology. Each virtual neuron includes a neuron function and logical network connection information that establishes weighted connections between different virtual neurons. A neural network processing function is executed using the neural network.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide networked virtual neurons for collective and reconfigurable neural network processing. The present embodiments thereby execute neural network tasks logically over edge-only or edge-cloud physical resources by replicating and dynamically reconfiguring virtual neurons. The virtual neurons run on normalized virtual machines and/or containers by decoupling logical neural network node and execution programs from the edge and cloud physical resources in a software-defined and scalable manner, similar to serverless strategies in the present cloud systems. In other words, the present embodiments can use heterogeneous edge and core hardware, provide flexible and dynamic control of virtual machine configurations and their connectivity that are needed to run virtual neurons and neural network programs, take advantage of existing realtime scheduling features of operating systems, save power and cost by deactivating neurons that are not being used, and provide security and privacy on demand, through data processing at edge systems before processing is passed to cloud systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
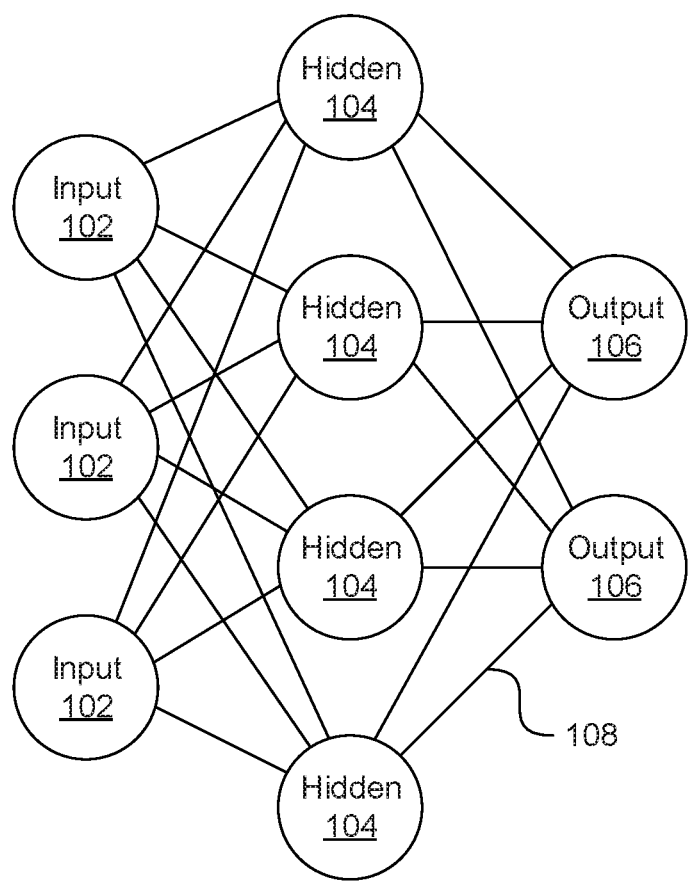
FIG. 1 is a prior art block diagram illustrating the general structure of a neural network.
Figure 2:
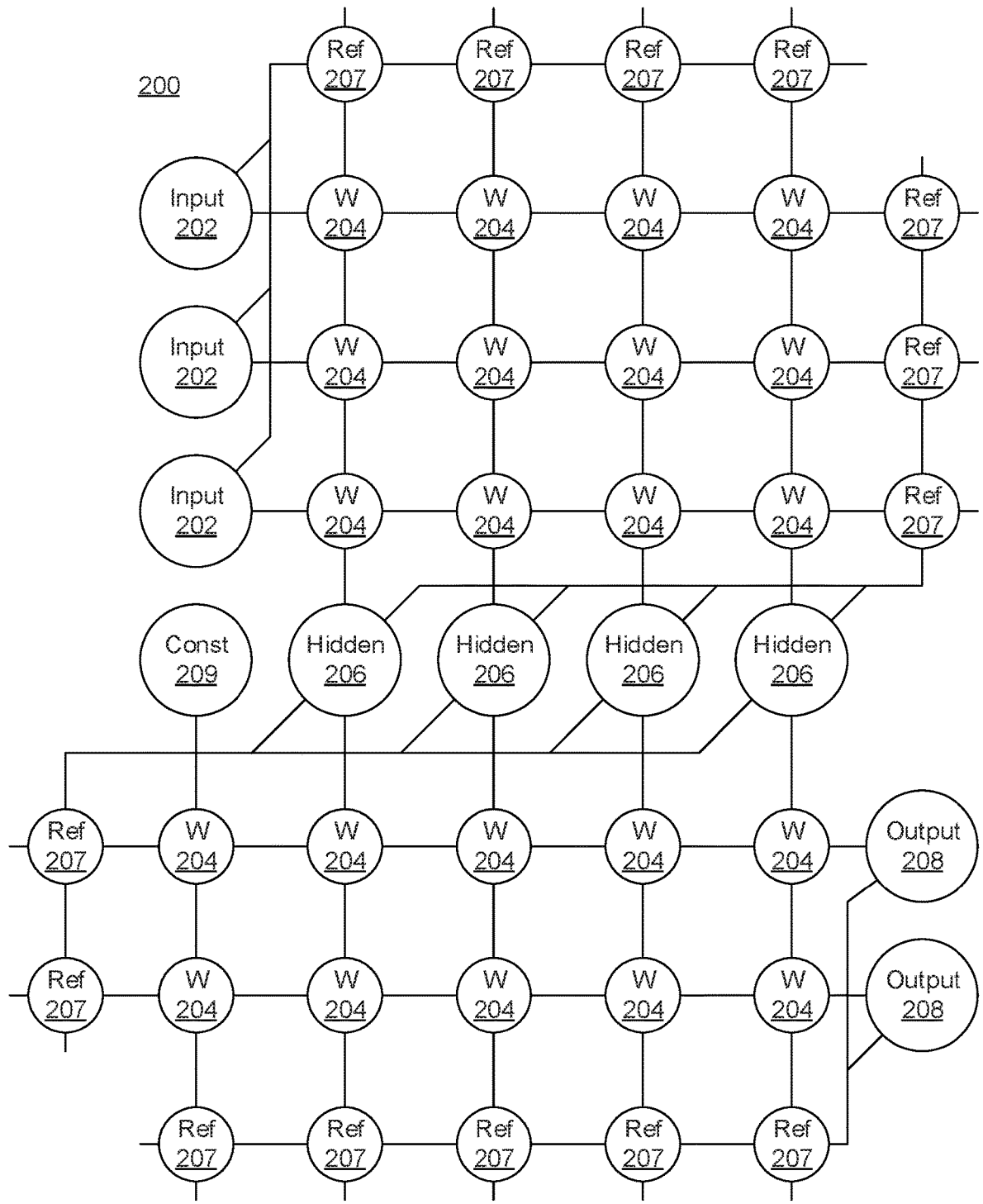
FIG. 2 is a block diagram illustrating the logical structure of a neural network in accordance with an embodiment of the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. During feed-forward operation, a set of input neurons 202 each provide an input signal in parallel to a respective row of weights 204. The weights 204 each have a settable value that they can, for example, multiply the input signal by, such that an output flows from the weight 204 to a respective hidden neuron 206 to represent the weighted input. The output from each weight adds column-wise and flows to a hidden neuron 206. A set of reference weights 207 may have an output and combine their outputs into a reference signal that is provided to each of the hidden neurons 206. Reference values are needed when only positive signal values are used, but these reference values can be omitted if both positive and negative values are used in the signals. In an example where the outputs produced by the weights 204 are continuously valued and positive, the reference weights 207 are used to provide a reference signal value, above which the signal values are considered to have positive values and below which the signal values are considered to have negative values.

The hidden neurons 206 use the weighted outputs from the array of weights 204 to perform some calculation. The hidden neurons 206 then create an output signal of their own to another array of weights 207. This array performs in the same way, with a column of weights 204 receiving a signal from their respective hidden neurons 206 to produce a weighted output that adds row-wise and is provided to the output neuron 208.

It should be understood that any number of these stages may be implemented, by interposing additional layers of arrays and hidden neurons 206. It should also be noted that some neurons may be constant neurons 209, which provide an output signal to the array. The constant neurons 209 can be present among the input neurons 202 and/or hidden neurons 206 and are only used during feed-forward operation. Furthermore, neural networks may have recurrent connections, including LSTM (Long Short-Term Memory).

During back propagation, the output neurons 208 provide a feedback signal back across the array of weights 204. The output layer compares the generated network response to training data and computes an error. In this example, a row of weights 204 receives a feedback signal from a respective output neuron 208 in parallel and converts weights the feedback signal, which adds column-wise to provide a feedback input to hidden neurons 206. The hidden neurons 206 combine the weighted feedback signal with a derivative of its feed-forward calculation and stores an error value before outputting a feedback signal to its respective column of weights 204. This back propagation travels through the entire network 200 until all hidden neurons 206 and the input neurons 202 have stored an error value.

During weight updates, the individual weights 204 change their weight values in response to the feedback signals. In this manner the weights 204 can be trained to adapt the neural network 200 to errors in its processing. It should be noted that the three modes of operation, feed forward, back propagation, and weight update, do not overlap with one another.

Figure 3:
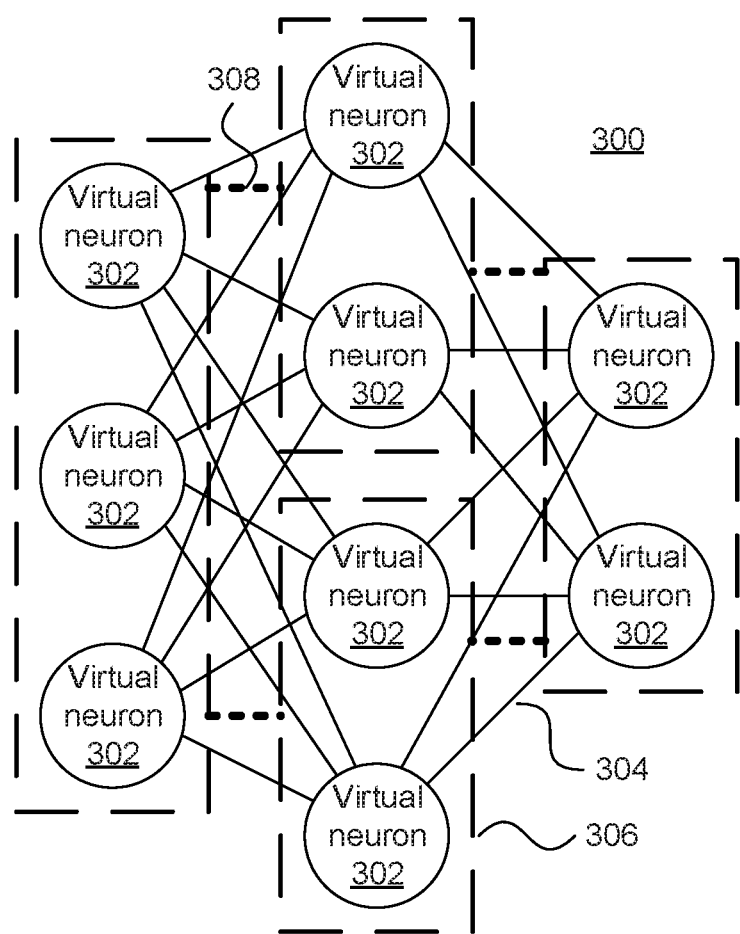
FIG. 3 is a block diagram illustrating the distribution of the neural network across distributed hardware in accordance with an embodiment of the present invention.

Referring now to FIG. 3, a neural network 300 is shown that is implemented across multiple different hardware nodes 306 and physical connections 308, each implementing one or more virtual neurons 302, running on respective normalized virtual machines, and their logical connections 304. The virtual machine nodes track logical connections 304 between the virtual neurons 302, maintaining information regarding which virtual neurons 302 send their outputs to which other virtual neurons 302 and what weights to apply to each such connection. The weights may be stored in the source or destination node. It should be understood that the network topology shown in FIG. 3 is solely for the purpose of illustration and should not be considered limiting. Any appropriate neural network topology may be used instead of that shown in FIG. 3.

The hardware nodes 306 are each designated either master or slave, with one master node controlling the configuration of the network 300 in a software-defined manner and with the slave nodes accepting instructions regarding the implementation and configuration of their virtual neurons 302 from the master node. The master node may, in some embodiments, only perform the control and configuration of the network without hosting virtual neurons. It should be noted that the hardware nodes 306 may be master-capable nodes or slave-only nodes, and that multiple master-capable nodes may be present in the network 300, providing the ability for the status of master node to be reassigned to another master-capable hardware node.

The neural network 300 can thereby be mapped to edge physical resources, including hardware nodes 306 and physical network resources, using the virtual neurons 302. Each virtual neuron 302 may include a virtual machine and virtual neuron software running on the virtual machine. The master node activates virtual neurons 302 in an event/data driven manner, with virtual neurons 302 being created and deactivated as they are needed, responsive to an activity level of those neurons. The localization of virtual neurons 302 are also efficient for local on-line learning, where only a feed-forward path is needed without global and deep backpropagation.

It should be understood that some hardware nodes 306 may be implemented at network edges and some may be implemented in a cloud system. In one particular example, data inputs may be provided to edge systems for, e.g., feature extraction and attention applications, with local-online learning being performed in the edge nodes. The outputs of the edge nodes may then be passed to a cloud master node that performs tasks relating to, e.g., identification or classification, with non-local learning such as deep backpropagation.

In one specific example, each hardware node may have, e.g., network input/output properties to permit up to 4096 (or even more) virtual individual connections. Resources for a given hardware node 306 may be divided up between virtual neurons 302 in both time and space. For example, if a given hardware node 306 includes ten processor cores and implements one thousand virtual neurons 302, each core may process one hundred virtual neurons 302 with using time multiplexed virtual machines and their virtualized connections.

Figure 4:
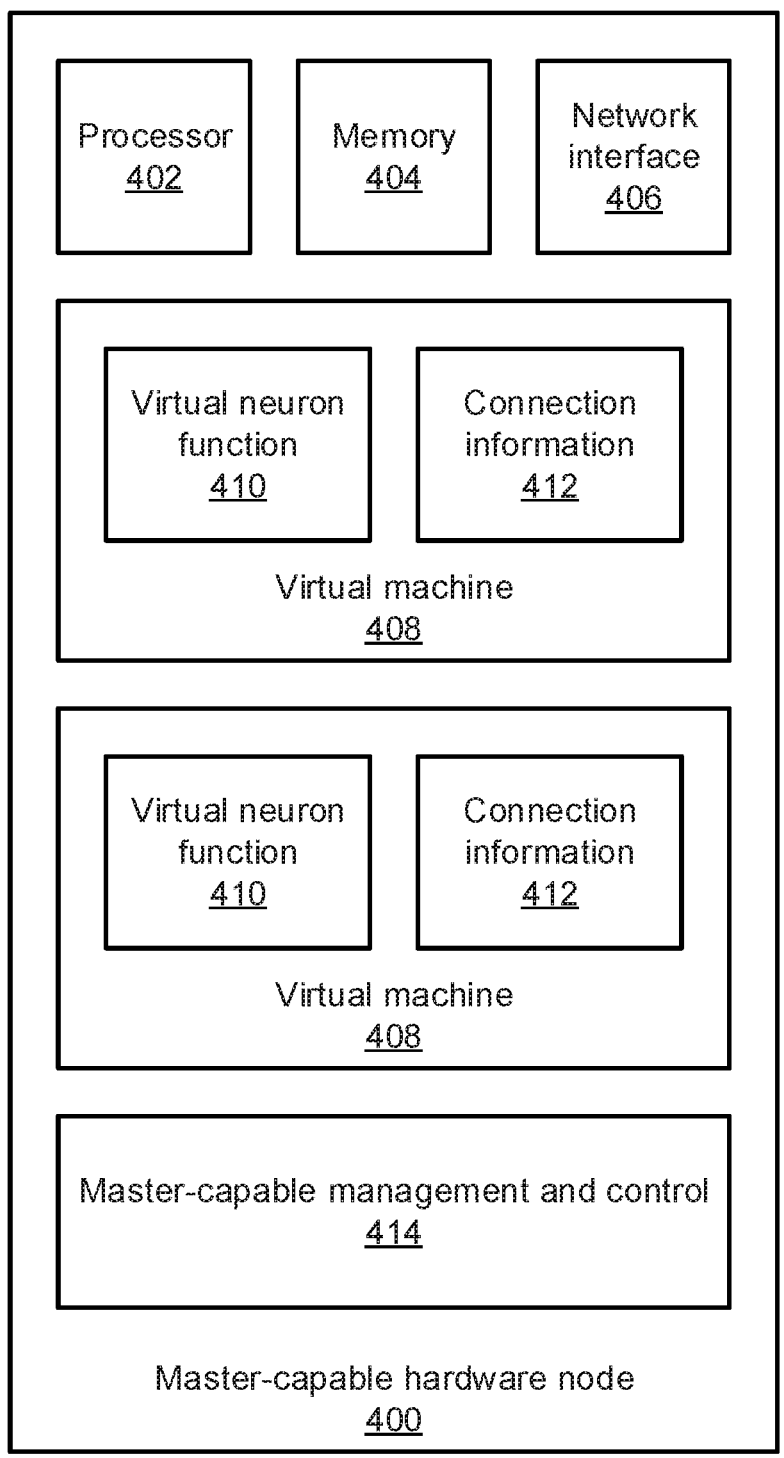
FIG. 4 is a block diagram illustrating a master-capable hardware node in a distributed neural network in accordance with an embodiment of the present invention.

Referring now to FIG. 4, a diagram of a master-capable hardware node 400 is shown. The master-capable node 400 includes a hardware processor 402 and memory 404. It should be understood that the hardware processor 402 may include a single, unitary processing element or may, alternatively, include multiple processors or a single processor having multiple cores. A network interface 406 allows the master-capable node 400 to communicate with other nodes 306 in a neural network 300 and may represent any appropriate form of communications interface. The master-capable node 400 may furthermore include one or more functional modules that, in some embodiments, can be implemented in the form of software that is stored in memory 404 and executed by processor 402 and, in other embodiments, can be implemented in the form of one or more discrete hardware components in the form of, e.g., application-specific integrated chips or field programmable gate arrays.

The master-capable node 400 runs one or more virtual machines 408. In embodiments where the hardware processor 402 includes multiple processing elements or cores, a number of the virtual machines 408 may be run that corresponds to the number of processing elements or cores, e.g., running one virtual machine per processing element. In heterogeneous hardware node environments, the number of normalized virtual machines per processing element or core may correspond to the processing capability of the elements or cores. Each virtual machine 408 implements a virtual neuron function 410 that can process one or any given number of virtual neurons, accepting input data and applying the virtual neuron function 410 to generate an output. Each virtual machine 408 also tracks connection information, accessing data output by previous layers and sending data from the virtual neuron function to a subsequent layer. The connection information 412 may further include weight information for each connection, providing a weigh for incoming data and/or outgoing data. This weight information may represent, for example, a fractional value between zero and one that is multiplied against the input or the output.

Each virtual machine 408 therefore represents a respective virtual neuron 302, with the virtual neuron function 410 being defined and provisioned upon activation of the virtual machine 408. The virtual neuron function 410 and the connection information 412 of each virtual machine 408 can be activated, dynamically reconfigured, and deactivated as needed for a particular application.

A master-capable management and control module 414 controls the activation and deactivation of virtual machines 408 as well as management of the connection information 412 of each virtual machine 408. It is specifically contemplated that any number of virtual machines 408 may be run on a given master-capable node 400, with virtual machines 408 being activated or deactivated as-needed and on a per-neuron basis.

The master-capable management and control module 414 furthermore has the ability to issue commands to other hardware nodes 306 when the master-capable node 400 is indeed acting in the role of the master node. These commands can include instructions to activate or deactivate individual virtual neurons 302 at those other hardware nodes 306 and can furthermore include instructions to change the neuron function and input and output connections and weights of those virtual neurons 302. If the master-capable node 400 is not designated as the master node, the master-capable management and control module 414 will provide reporting information to the master node. The master-capable management and control module 414 may furthermore broadcast the capabilities of the master-capable node 400, including for example a maximum number of external inputs and outputs, possible data types (including, e.g., fixed, floating, spike trains, etc.), maximum number of edges per node, and maximum number of neurons and throughput index.

The master-capable management and control module 414 furthermore can be dynamically reconfigured to set the status of the master-capable hardware node 400 between a master and a slave role, transferring master status to another master-capable node 400 as needed. The master node is selected from the master-capable nodes 400 in the neural network 300 by any appropriate mechanism.

The master node thus, through its master-capable management and control module 414, defines the topology of the neural network 300 in accordance with the application at hand. Thus, the master-capable management and control module 414 can determine which hardware nodes 306 correspond to which layers of the neural network 300, how many virtual neurons 302 are implemented in each hardware node 306, and how those virtual neurons 302 connect to the virtual neurons 302 of other hardware nodes 306.

The master-capable hardware node 400 may include any number of appropriate software layers, including for example an operating system layer, a virtual machine layer, container layer, and a neuron layer. The operating system layer may have, for example, realtime scheduling capabilities and a communications stack to handle the operations of the virtual machines 408 and the master-capable management and control module 414. The master-capable management and control module 414 can furthermore provide slave function capabilities as discussed below when the master-capable hardware node 400 works as a slave node.

Figure 5:
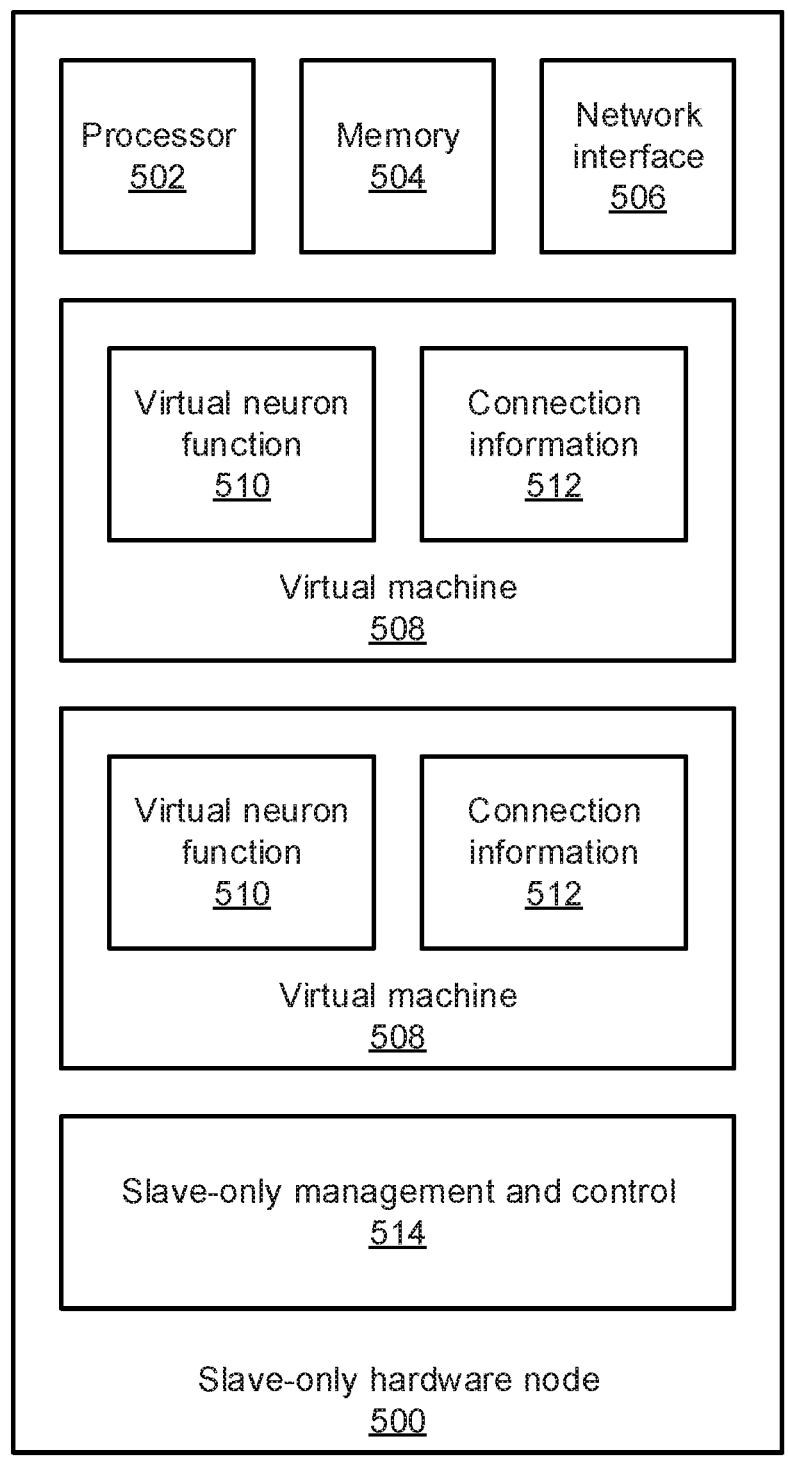
FIG. 5 is a block diagram illustrating a slave-only hardware node in a distributed neural network in accordance with an embodiment of the present invention.

Referring now to FIG. 5, a diagram of a slave-only hardware node 500 is shown. The slave-only node 500 includes a hardware processor 502 and memory 504. It should be understood that the hardware processor 502 may include a single, unitary processing element or may, alternatively, include multiple processors or a single processor having multiple cores. A network interface 506 allows the slave-only node 500 to communicate with other nodes 306 in a neural network 300 and may represent any appropriate form of communications interface. The slave-only node 500 may furthermore include one or more functional modules that, in some embodiments, can be implemented in the form of software that is stored in memory 504 and executed by processor 502 and, in other embodiments, can be implemented in the form of one or more discrete hardware components in the form of, e.g., application-specific integrated chips or field programmable gate arrays.

The slave-only node 500 runs one or more virtual machines 508. In embodiments where the hardware processor 502 includes multiple processing elements or cores, a number of the virtual machines 508 may be run that corresponds to the number of processing elements or cores, e.g., running one virtual machine per processing element. In heterogeneous hardware node environments, the number of normalized virtual machines per processing element or core may correspond to the processing capability of the elements or cores. Each virtual machine 508 implements a virtual neuron function 510 that can process one or more virtual neurons, accepting input data and applying the virtual neuron function 510 to generate an output. Each virtual machine 508 also tracks connection information, accessing data output by previous layers and sending data from the virtual neuron function to a subsequent layer. The connection information 512 may further include weight information for each connection, providing a weigh for incoming data and/or outgoing data. This weight information may represent, for example, a fractional value between zero and one that is multiplied against the input or the output.

Each virtual machine 508 therefore represents a respective virtual neuron 302, with the virtual neuron function 510 being defined and provisioned upon activation of the virtual machine 508. The virtual neuron function 510 and the connection information 512 of each virtual machine 508 can be activated, dynamically reconfigured, and deactivated as needed for a particular application.

A slave-only management and control module 514 controls the activation and deactivation of virtual machines 508 as well as management of the connection information 512 of each virtual machine 508. It is specifically contemplated that any number of virtual machines 508 may be run on a given slave-only node 500, with virtual machines 508 being activated or deactivated as-needed and on a per-neuron basis.

The slave-only hardware node 500 is therefore similar to a master-capable node 400, but lacks the ability to become a master node and to issue control and management instructions to other hardware nodes 306. The slave-only node 500 receives and implements such commands from the master node and provides provide reporting information to the master node. The slave-only management and control module 514 may furthermore broadcast the capabilities of the master-capable node 500, including for example a maximum number of external inputs and outputs, possible data types (including, e.g., fixed, floating, spike trains, etc.), maximum number of edges per node, and maximum number of neurons and throughput index.

The slave-only node 500 may include any number of appropriate software layers, including for example an operating system layer, a virtual machine layer, container layer, and a neuron layer. The operating system layer may have, for example, realtime scheduling capabilities and a communications stack to handle the operations of the virtual machines 508 and the slave-only management and control module 514.

Figure 6:
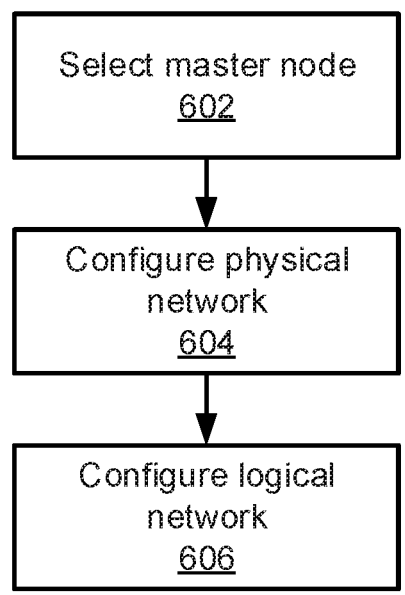
FIG. 6 is a block/flow diagram illustrating the configuration of a distributed neural network in accordance with an embodiment of the present invention.

Referring now to FIG. 6, a method for initializing a neural network 300 is shown. Block 602 selects a master node from among a set of one or more master-capable hardware nodes 400. This selection may be made manually or may, alternatively, be made by collaboration among the master-capable hardware nodes 400 in the network.

Block 604 then configures the physical network, establishing physical network links between hardware nodes. Any appropriate network topology can be used, with links being created or dropped by any appropriate means. In some embodiments the physical network may be created manually through the use of conventional switches, routers, or any other network control device. In other embodiments, the physical network may be configured in wireless environments for mobile edge devices.

Block 606 then creates the logical network between the virtual neurons 302. The logical network may be created automatically through the use of software defined networking devices that can adaptively create and drop links through software. In this case, the master-capable hardware node can work as software-defined network controller node. The physical network and the logical network are created according to the needs of the particular application, where the neural network topology needed dictates both the physical links between hardware nodes 306 as well as the logical links between the virtual neurons 302 hosted within each hardware node 306.

Figure 7:
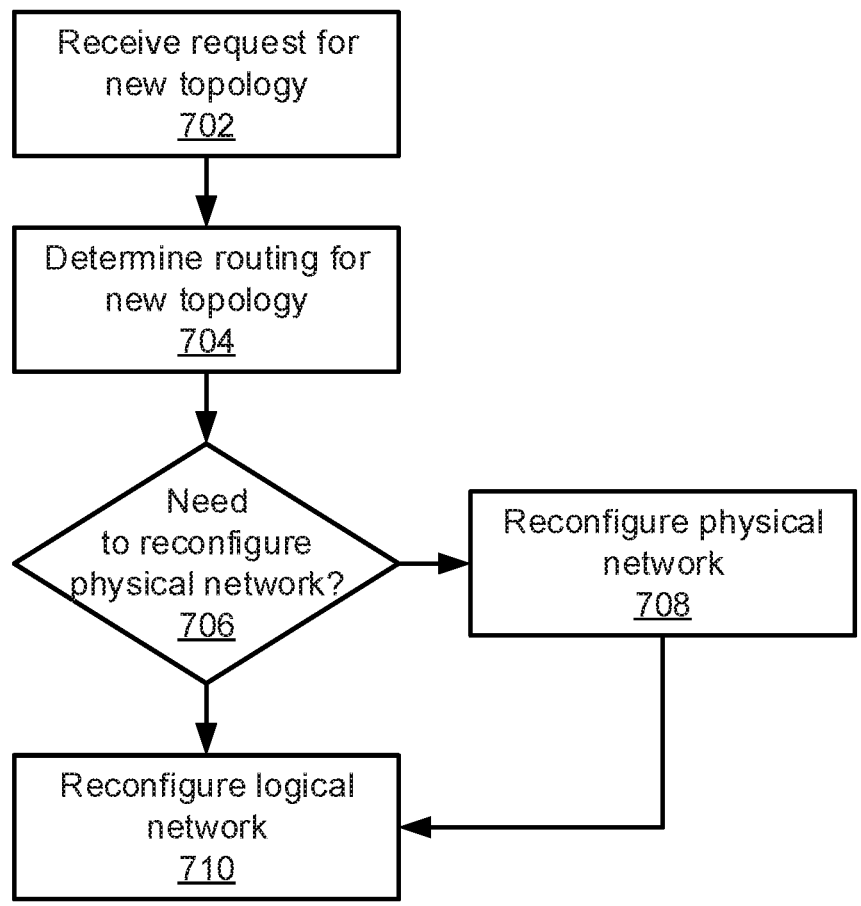
FIG. 7 is a block/flow diagram illustrating the reconfiguration of a distributed neural network in accordance with an embodiment of the present invention.

Referring now to FIG. 7, a method for reconfiguring a neural network 300 is shown. In block 702, a request for a new network topology may be received by the master node from, e.g., an application program or an administrator. In other embodiments, the master node may determine for itself that a new topology is needed, for example if a hardware node 306 goes offline due to a hardware, software, or network fault. The new topology reflects a neural network topology needed to perform a new application function or to continue to perform a previous application function after a neural network fault.

Block 704 determines routing needed for the new network topology. This may be performed by the master node or may be performed at some external system or program. Block 706 determines whether the new routing necessitates a change in the physical network topology. If so, block 708 reconfigures the physical network using, e.g., software defined networking systems. Block 708 may be executed by the master node to dynamically change the connections between hardware nodes 308. In the case where the master hardware node is changed, the configuration process of FIG. 6 is performed again.

Whether or not the physical network topology is changed, block 710 reconfigures the logical network by changing the connections between virtual nodes 302. The master node issues commands to each slave node, changing the connection information stored in each virtual machine.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 8:
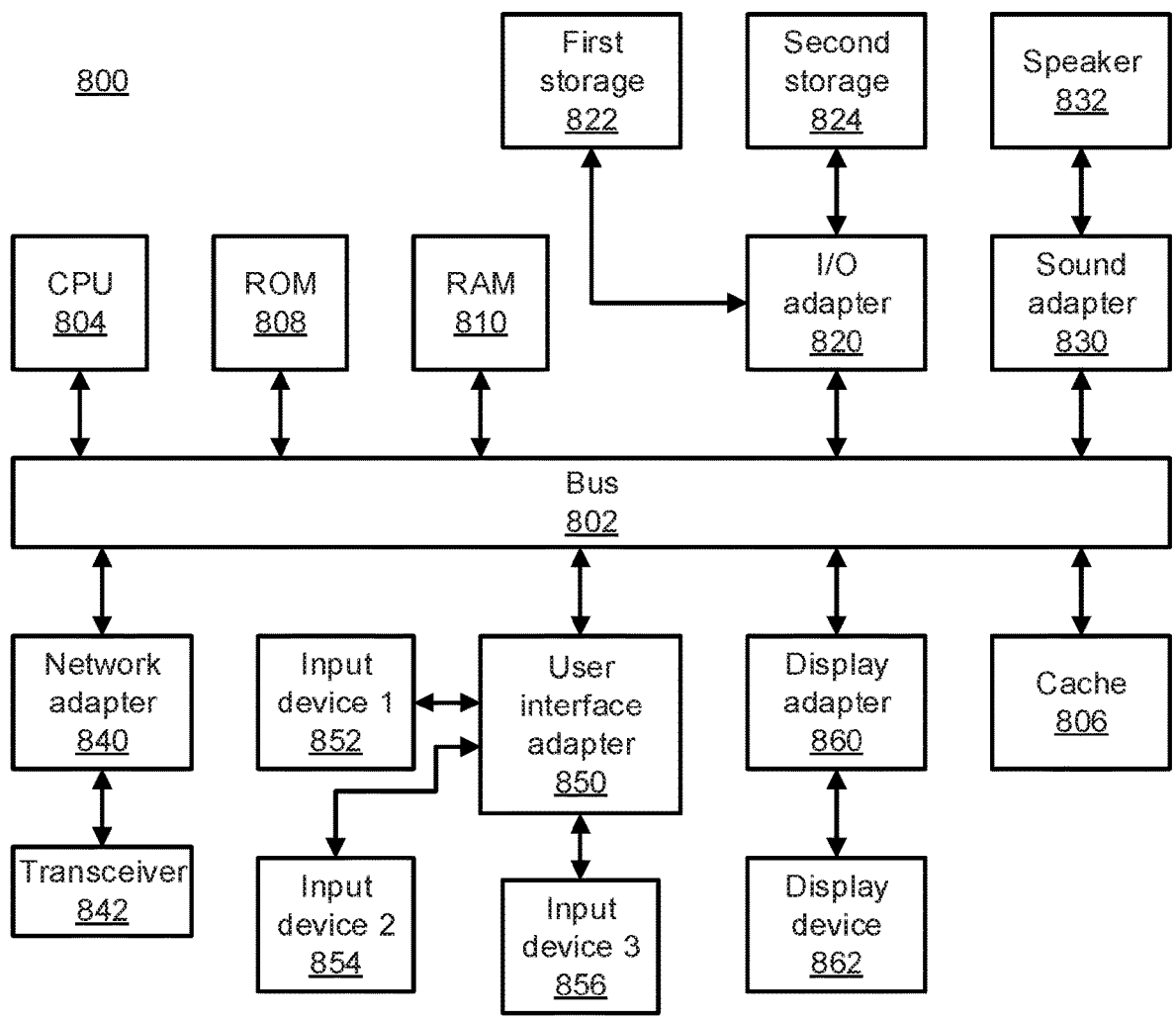
FIG. 8 is a block diagram of a processing system in accordance with an embodiment of the present invention.

Referring now to FIG. 8, an exemplary processing system 800 is shown which may represent the master-capable hardware node(s) 400 and/or the slave-only hardware node(s) 500. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
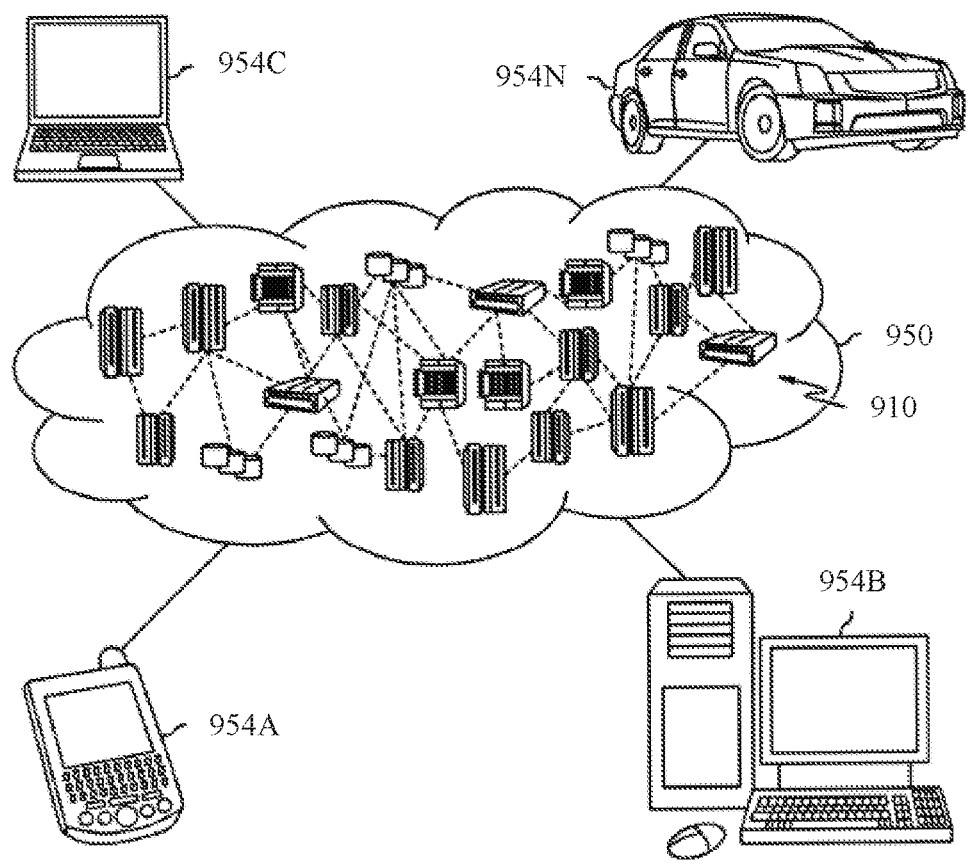
FIG. 9 is a diagram of a cloud computing environment according to the present principles.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
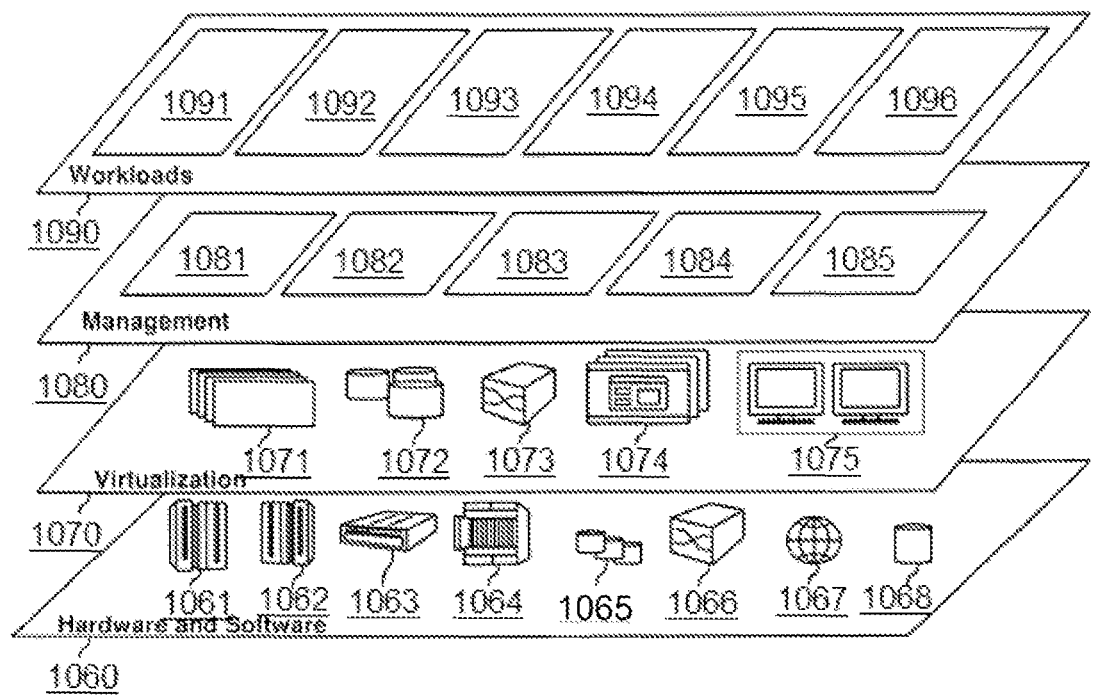
FIG. 10 is a diagram of abstraction model layers according to the present principles.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and neural network processing 1096.

Having described preferred embodiments of dynamically reconfigurable networked virtual machines for neural network processing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims:

1. A method for neural network processing, comprising:
configuring a physical network topology for a network that includes a plurality of hardware nodes in accordance with a first neural network topology, one of which is designated as a master node with any other nodes in the network being designated as slave nodes;
configuring one or more virtual machines at each of the plurality of hardware nodes;
configuring one or more virtual neurons at each of the one or more virtual machines by the master node, each virtual neuron comprising a neuron function and logical network connection information that establishes weighted connections between different virtual neurons, to create a neural network having the first neural network topology;
executing a neural network processing function using the neural network;
determining a new logical network topology in accordance with an updated neural network topology that creates new individual virtual neurons or that destroys individual virtual neurons based on a respective activity level; and
reconfiguring the logical network connection information of the virtual neurons by the master node to implement the new logical network topology.

2. The method of claim 1, wherein the plurality of hardware nodes comprises a plurality of master-capable hardware nodes.

3. The method of claim 2, further comprising designating one master-capable hardware node from the plurality of hardware nodes as the master node.

4. The method of claim 3, further comprising designating a new master node in response to a change in the physical network topology.

5. The method of claim 1, further comprising reconfiguring the physical network topology for the network in accordance with the updated neural network topology.

6. The method of claim 1, further comprising updating the first neural network topology in response to a network failure or to a failure of a hardware node.

7. The method of claim 1, wherein at least one hardware node is an edge system that processes input data and wherein at least one hardware node is a cloud system.

8. The method of claim 7, wherein each of the plurality of hardware nodes hosts a number of virtual neurons that corresponds to a number of processing elements at the hardware node.

9. The method of claim 5, wherein the updated neural network topology dictates different physical links between the hardware nodes and different logical links between the virtual neurons as compared to the first neural network topology.

10. The method of claim 1, wherein configuring the one or more virtual machines at each of the plurality of hardware nodes includes configuring a number of virtual machines at each node of the plurality of hardware nodes that corresponds to a number of processor cores at the node.

11. A non-transitory computer readable storage medium comprising a computer readable program for neural network processing, wherein the computer readable program when executed on a computer causes the computer to perform the steps of:
configuring a physical network topology for a network that includes a plurality of hardware nodes in accordance with a first neural network topology, one of which is designated as a master node with any other nodes in the network being designated as slave nodes;
configuring one or more virtual machines at each of the plurality of hardware nodes;
configuring one or more virtual neurons at each of the one or more virtual machines by the master node, each virtual neuron comprising a neuron function and logical network connection information that establishes weighted connections between different virtual neurons, to create a neural network having the first neural network topology;
executing a neural network processing function using the neural network;
determining a new logical network topology in accordance with an updated neural network topology that creates new individual virtual neurons or that destroys individual virtual neurons based on a respective activity level; and
reconfiguring the logical network connection information of the virtual neurons by the master node to implement the new logical network topology.

12. A system for neural network processing, comprising:
a master hardware node in communication with one or more slave hardware nodes, comprising a processor configured to:
configure a physical network topology for a network that includes the master hardware node and the one or more slave hardware nodes in accordance with a first neural network topology;
configure one or more virtual machines at each of the master hardware node and the one or more slave hardware nodes;
configure one or more virtual neurons at the one or more virtual machines, each virtual neuron comprising a neuron function and logical network connection information that establishes weighted connections between different virtual neurons, to create a neural network having the first neural network topology;
execute a neural network processing function using the neural network;
determine a new logical network connection topology in accordance with an updated neural network topology that creates new individual virtual neurons or that destroys individual virtual neurons based on a respective activity level; and
reconfigure the logical network connection information of the virtual neurons by the master node to implement the new logical network topology.

13. The system of claim 12, wherein the one or more slave hardware nodes comprise at least one master-capable hardware node.

14. The system of claim 12, wherein the processor is further configured to reconfigure the physical network topology for the network in accordance with the updated neural network topology.

15. The system of claim 12, wherein the processor is further configured to update the first neural network topology in response to a network failure or to a failure of a hardware node.

16. The system of claim 12, wherein each slave hardware node hosts virtual neurons on a single layer of the neural network.

17. The system of claim 12, wherein at least one hardware node selected from the group consisting of the master hardware node and the one or more slave hardware nodes is an edge system that processes input data and wherein at least one hardware node selected from the group consisting of the master hardware node and the one or more slave hardware nodes is a cloud system.

18. The system of claim 12, wherein each of the master hardware node and the one or more slave hardware nodes hosts a number of virtual neurons that corresponds to a number of processing elements at the respective node.

* * * * *